B. M. W. HANSON.
STOP MECHANISM FOR LATHES.
APPLICATION FILED JUNE 28, 1916. RENEWED JULY 31, 1918.
1,282,819.
Patented Oct. 29, 1918.
2 SHEETS—SHEET 1.
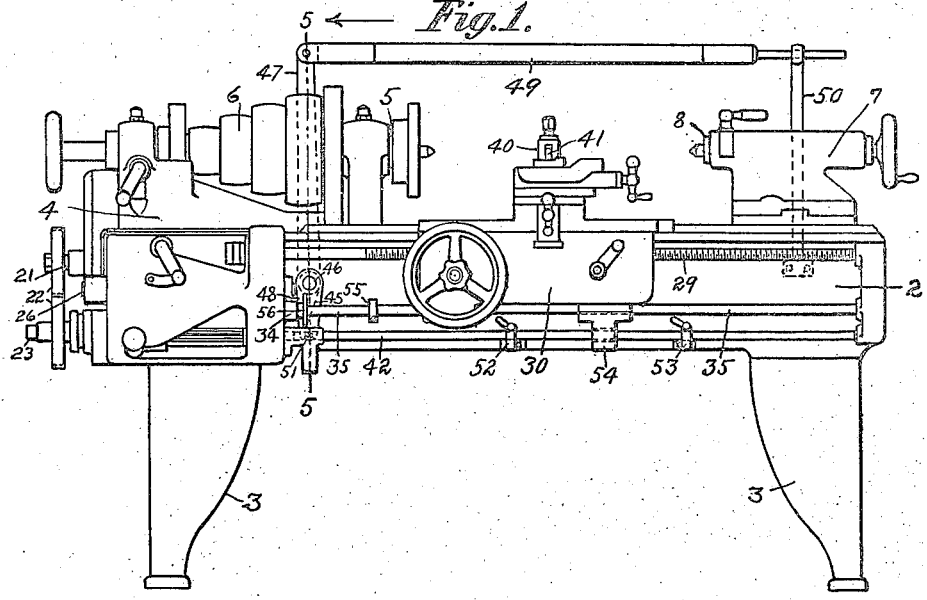
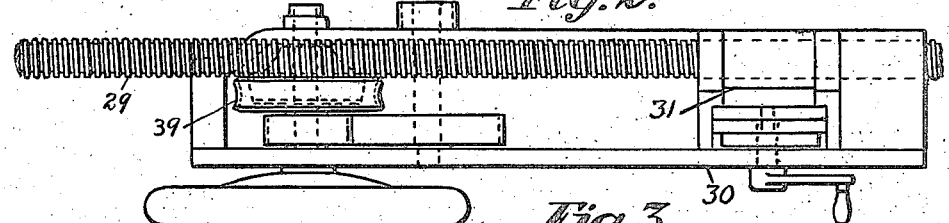
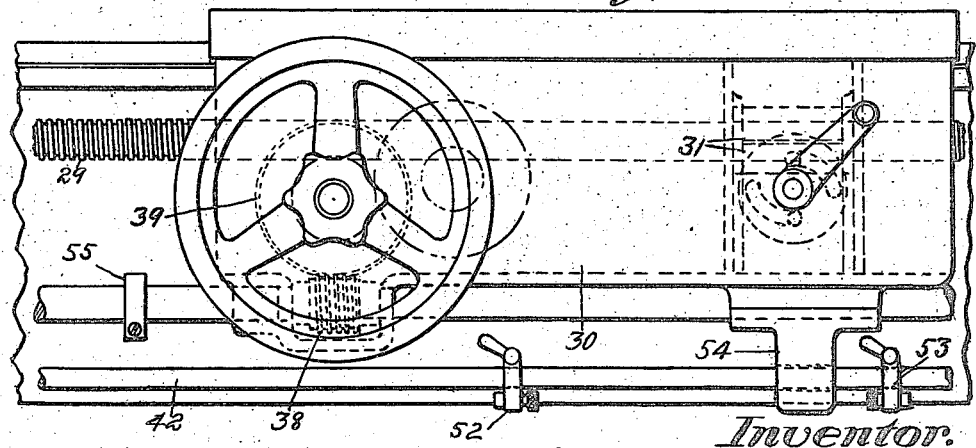
Inventor.
B. M. W. Hanson

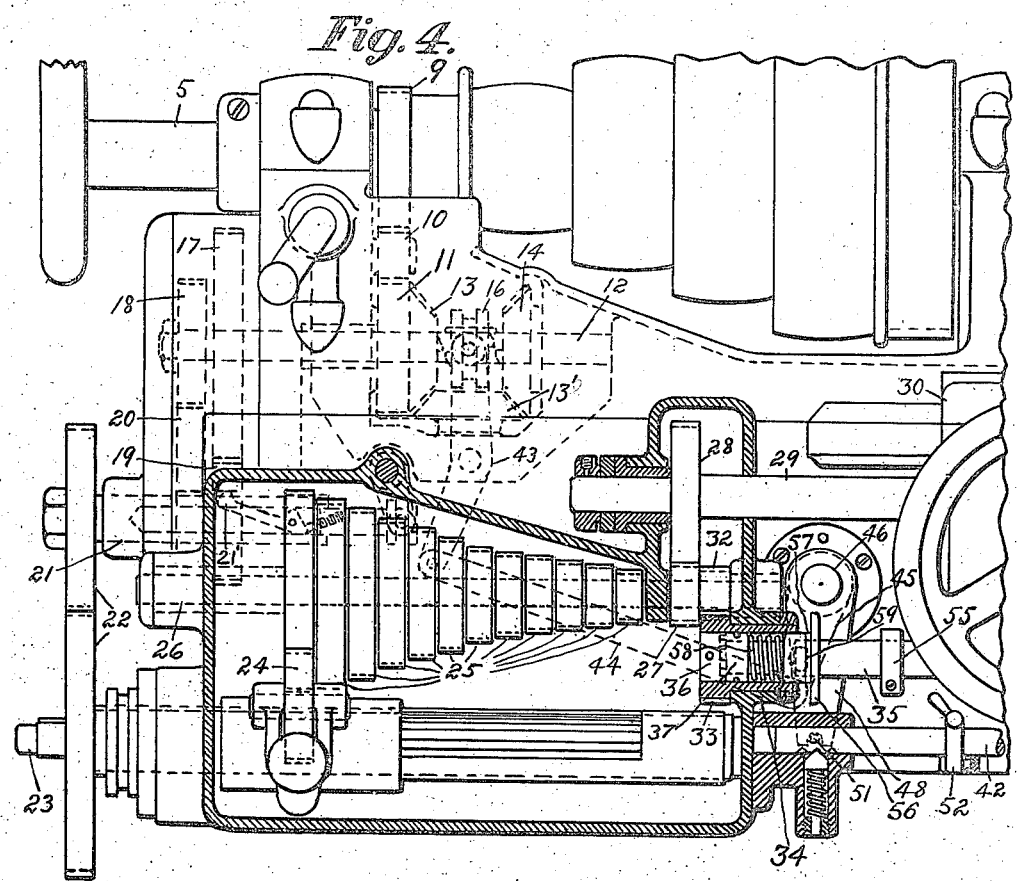

UNITED STATES PATENT OFFICE.

BENGT M. W. HANSON, OF HARTFORD, CONNECTICUT, ASSIGNOR TO PRATT & WHITNEY COMPANY, OF NEW YORK, N. Y., A CORPORATION OF NEW JERSEY.

STOP MECHANISM FOR LATHES.

1,282,819.  Specification of Letters Patent.  Patented Oct. 29, 1918.

Application filed June 28, 1916, Serial No. 106,369. Renewed July 31, 1918. Serial No. 247,675.

*To all whom it may concern:*

Be it known that I, BENGT M. W. HANSON, a citizen of the United States, residing at Hartford, in the county of Hartford and State of Connecticut, have invented certain new and useful Improvements in Stop Mechanism for Lathes, of which the following is a specification.

This invention relates to lathes which have provision for turning and for thread-cutting. It sometimes happens that an attendant after using the machine for threading fails to set the knock-off means used during turning into action. In this case the machine is apt to be seriously injured. I provide means of a simple and effective nature which will practically eliminate possibility of accidents arising from the forgetfulness in question.

In the drawings accompanying and forming part of the present specification I have shown in detail one convenient form of embodiment of the invention which to enable those skilled in the art to practice the same will be set forth fully in the following description. I do not restrict myself to this particular disclosure, however, as I may depart therefrom in several respects within the scope of the invention defined by the claims following said description.

Referring to said drawings:

Figure 1 is a front elevation of a lathe involving the invention.

Fig. 2 is a top plan view of the lead screw, part of the carriage and certain adjuncts.

Fig. 3 is a front elevation of the parts shown in Fig. 2, the feed rod and controlling rod appearing.

Fig. 4 is a front elevation partly in section of the head end of the machine, the section being on the line 4—4 of Fig. 5, looking in the direction of the arrow.

Fig. 5 is a transverse section on the line 5—5 of Fig. 1, looking in the direction of the arrow.

Like characters refer to like parts throughout the several views, which are on different scales.

The several parts of the lathe may be supported in any suitable way, for instance by the base or bed 2 provided with depending legs 3 as common. The head stock is designated by 4 and it is equipped with the main or live spindle 5 which may be driven in any convenient manner as by the cone pulley 6. The tail stock is denoted by 7, being furnished with the spindle 8. The work is supported, as usual, between centers respectively carried by the two spindles 5 and 8. Rotative with the spindle 5 is the spur gear 9 in mesh with the idler 10 rotatively carried by a bearing on the head stock 4. The pinion 10 in turn meshes with the spur gear 11 loose on the shaft 12 also sustained by the head stock. Rigid with the spur gear 11 is the bevel gear 13 in mesh with the bevel gear 13' on the head stock. The bevel gear 13' is in mesh with the bevel gear 14 loosely carried by said shaft 12, the two bevel gears 13 and 14 facing oppositely. Between said bevel gears 13 and 14 is a clutch member 16 splined or otherwise suitably connected with the shaft 12. The clutch member is shown as occupying its neutral position in Fig. 4. It will be assumed that it is connected with the bevel gear 13. When the clutch member 16 is engaged with the bevel gear 13 the shaft 12 is rotated in a forward direction, and when the clutch element is engaged with the bevel gear 13 the shaft 12 is rotated in a backward direction. Fastened to the outer end of the shaft 12 are the spur gears 17 and 18 in mesh respectively with spur gears 19 and 20 loose on the shaft 21 and adapted to be alternately clutched thereto by a clutch device as 21'. The shaft 21 is connected with the shaft 23 by change gearing denoted in a general way by 22. Associated with said shaft 23 is a gear 24 adapted to be connected at will with any one of the different size gears 25 on the shaft 26. Said shaft 26 is provided with the pinion 27 in mesh with the spur gear 28 fastened to the lead screw 29, this lead screw extending through the carriage 30. In the construction shown the carriage comprises a slide, the base or bed having ways to receive said carriage or slide for longitudinal movement forward and backward. The carriage 30 is equipped with a tool post 40 provided with a tool 41. It will be assumed that the gear 24 is in mesh with one of the gears 25, that the spindle 5 is being rotated and that the clutch member 16 is in engagement with the bevel gear 13. As a result the lead screw 29 will be rotated to advance the slide 30 or move it toward the left in Fig. 1 for thread-cutting, provided the half nuts 31 carried by the slide are in clamping engagement with the lead screw. Should the half nuts 31 be in engagement with the lead screw and should the clutch member 16 be in engagement with the bevel gear 14, the carriage or slide 30 will be moved toward the right provided the spindle 5 is rotating. Fixed to the shaft 26 is the pinion 32 in mesh with the pinion 33 inclosed by the boxing 34 on the bed 2 and in which the gears 25 are mounted. This spur gear 33 has an elongated hub 34 supported by and extending through a bearing opening in the inner wall of the boxing 34. The pinion 33 and its hub receive the feed rod 35 to the extreme head end of which the clutch section 36 is connected. This clutch section 36 coöperates with the clutch section 37 inclosed by and pinned or otherwise suitably connected to the hub 34. The head portion of the feed rod 35 extends slidingly through the clutch section or half 37. Splined to the feed rod 35 is a worm 38 connected by worm gearing denoted in a general way by 39 on the carriage 30. It will be clear, therefore, that when the clutch sections 36 and 37 are engaged and that when the clutch member 16 is in engagement with the bevel gear 13, the feed rod 35 through the described parts will be rotated to effect the advance of the carriage 30 or its movement toward the left for example. It will be understood, of course that when threading the nuts 31 are in active relation, the worm gearing being at this time inactive and vice versa when turning.

The foregoing is a brief description of a lathe of more or less familiar construction and in which I have chosen to show the invention as incorporated. This invention, as will be obvious can be embodied with equal advantage in other constructions. The feed rod 35 and the controlling rod 42 hereinafter more particularly described are equipped with dogs as also common, these dogs being actuated by the carriage to effect stoppage of the movement thereof automatically.

In my Patent No. 1,237,511 dated August 21, 1917, I disclose a structure whereby the movement of the carriage can be automatically stopped when the carriage has completed a predetermined amount of movement in either direction. This mechanism is shown herein and some of its elements play a part in the new features, for which reason it is desirable that the points of said patent should be briefly set forth, but as will be evident, I do not restrict myself to the disclosure. Mounted in the base or bed 2 is a lever 43. The upper branch of this lever or arm 43 is forked to straddle the clutch member 16, the branches of the forked part having inwardly extending studs entering a peripheral groove or channel in the clutch member. To the lower branch of the clutch shifting device 43 is pivoted a link 44 jointed to the arm 45 fastened to and depending from the rock shaft 46 supported by and extending transversely of the bed 2. The lever 47 is connected rigidly to the front end of the rock shaft 46. To the rear end of the shaft 46 is connected the depending arm 48. By the operation of the lever 47 the clutch member 16 can be moved to engage either the bevel gear 13 or the bevel gear 14 to effect alternately forward and backward movements of the carriage 30 in the manner already set forth or to stop the movement of the carriage or slide. To the upper end of the hand lever 47 is connected the rod 49 having a guide connection with the post 50 fastened to and rising from the tail portion of the bed 2. This rod and hand lever 47 constitute a part of the subject matter of said patent.

The feed controlling rod 42 to which I have already referred has a connection with the lever 48 for example by a pin 51 entering a notch in the free end of said lever or arm 48. On said feed controlling rod 42 are dogs 52 and 53 alternately engageable by the pendent portion 54 of the carriage 30. The construction is such as will be understood, that when the carriage is in motion and when it has completed a predetermined movement in either direction, it will engage one of the dogs as 52 and 53 to thus through the intervening parts move the clutch member 16 to neutral or intermediate position and thus automatically stop further movement of the carriage. The foregoing as will be clear is a description of what is old in lathes and also what is new to me in my said patent. On the feed rod 35 is a single dog 55 which is used in turning, the dogs 52 and 53 being used in threading. It will be assumed that the dog 55 is set and that the machine is arranged for turning. When the carriage 30 has practically completed its advancing movement, the body portion of the carriage strikes the dog 55 and thus moves the rotary feed rod 35 with it, thereby moving the clutch section 36 out of engagement with the clutch section 37. The two clutch sections are disengaged just as the turning operation is concluded, so that at this point the movement of the carirage is stopped. It will be understood, of course, that this automatic knock-off device is old in the art.

It frequently happens that an operator after changing over the machine from threading to turning, forgets to set the dog 55, and in this case there is nothing to effect endwise movement of the feed rod 35 or its equivalent and the consequent stopping of the carriage at the proper point. In this event the carriage continues to advance and causes at times considerable injury. It is the aim of the invention as may be inferred to prevent this damaging possibility. The disk 56 provided with the somewhat elongated hub 57 surrounds the feed rod 35, the latter in the construction shown being slidable through the disk and its hub. The normal position of the disk and its hub are shown in Fig. 4, being maintained in this relation for example by the coiled spring 58, one end of which bears against the hub and the other end of which engages the relatively fixed clutch section 57, the spring as will be clear, surrounding the feed rod. Should the dog 55 not be clamped to the feed rod 35, and should the carriage be advancing, the pendent portion 54 will strike the dog and will carry the dog therewith, and the dog will engage the disk 55 and move the disk with it. Located in the path of the disk on such movement is a projection 59 on the pendent lever 48. On the movement of the disk under the action of the carriage the disk engages the projection 59 to effect the swinging of the lever 48 to therefore effect through the intervening parts the movement of the clutch member 15 to neutral position and hence the stoppage of the machine, so that no injury can possibly ensue from this cause.

What I claim is:

1. In a lathe, the combination of a slide, mechanism for operating the slide, means settable at will and acted on by the slide, mechanism governed by said settable means when set and acted on by the slide for stopping the motion of the slide, and means supplemental to the aforesaid stopping mechanism for automatically effecting the stoppage of the slide should said settable means be not set in slide stopping relation.

2. In a lathe, the combination of a reciprocatory slide, a lead screw and a feed rod provided with means for operating the slide, a dog on the feed rod settable at will and engageable by the slide, automatically operative mechanism for stopping the motion of the slide when the dog is set and is moved by the slide, and means supplemental to the aforesaid stopping mechanism for also effecting stoppage of the slide should the dog be not set and be moved by the slide.

3. In a lathe, the combination of a slide, a lead screw and a feed rod provided with means for operating the slide, a dog slidable on the rod and adapted to be set by being clamped to the rod, the dog being disposed in the path of and to be engaged by the slide to move the rod endwise when the dog is engaged by the slide, mechanism governed by the rod when moved endwise for effecting stoppage of the slide, a member slidable on the rod and engaged and operated by the dog when unset and thus moved by the slide, and means supplemental to the aforesaid stopping mechanism and controlled by said slidable member for effecting the stoppage of the slide when said member is moved by said dog.

4. In a lathe, the combination of a slide and operating means therefor, a member settable at will, said member when set being shiftable by the slide, mechanism actuated by said member when set and shifted by the slide to effect stoppage of the slide, a second member shiftable by the first member independently of the said mechanism when the first member is unset and is moved by the slide, and means actuated by said second member when thus moved to also effect stoppage of the slide.

5. In a lathe, the combination of a slide and operating means therefor, a member settable at will and shiftable by the slide when set, mechanism actuated by said member when set for effecting the stoppage automatically of the slide, a second member operable by the first member independently of the said mechanism when the first member is unset and moved by the slide, and means governed by the second member for also automatically stopping the slide when the second member is operated by the first member through the agency of the slide.

6. In a lathe, the combination of a slide and operating means therefor, and independent means each operable by the slide for effecting stoppage of the slide, one of said means being constantly set and the other being settable at will.

7. In a lathe, the combination of a slide, operating mechanism for the slide, a member adapted when set to be engaged by the slide, mechanism operated by said member when set and actuated by the slide to effect automatic stoppage of the slide, a second member constantly set and engageable by the first member when moved by the slide and shiftable through the primary influence of the slide, and means supplemental to the aforesaid stopping mechanism and actuated by said second member for also automatically stopping the slide when said second member is shifted.

8. In a lathe, the combination of a slide and operating means therefor, separate means both actuated by the slide for effecting the stoppage of the slide, one of the means having a member which is constantly set and the other having a member which is settable at will.

9. In a lathe, the combination of a slide and operating means therefor, separate means both actuated by the slide for effecting the stoppage of the slide, one of the means having a member which is constantly set and the other having a member which is settable at will and which when unset engages and operates the companion member.

10. In a lathe, the combination of a slide, a lead screw provided with means for operating the slide, a rotary endwise movable feed rod provided with means for also operating the slide, a power driven member, a clutch section connected with the feed rod, a second clutch section through which the feed rod extends and connected with said power driven member, a collar on the feed rod, a spring between the second clutch section and the collar, a dog adapted to be set on the feed rod and to be engaged by the slide when the same has completed a predetermined movement to thereby disconnect the first clutch section from the second clutch section and thus stop the rotation of the feed rod, mechanism involving a power driven member and a clutch member for driving said power driven member, connections between said power driven member and the lead screw, a clutch shifting member, and means actuated by said collar for moving said clutch member to neutral position.

11. In a lathe, the combination of a slide, a lead screw provided with means for operating the slide, an endwise movable rotary feed rod also provided with means for operating the slide, means carried by the feed rod and adapted when set to be actuated by the slide to move the rod endwise, means governed by the endwise movement of the rod for effecting stoppage of the slide, a member slidable on the feed rod and in the path of said dog when unset to be moved by the slide, a lever adapted to be operated by said member when moved under the influence of the slide, and means actuated by said lever when thus actuated for stopping the slide.

In testimony whereof I affix my signature in the presence of a witness.

B. M. W. HANSON.

Witness:
W. M. STORRS.